US011887255B2

(12) United States Patent
Zhu

(10) Patent No.: US 11,887,255 B2
(45) Date of Patent: Jan. 30, 2024

(54) METHOD AND SYSTEM FOR RENDERING BOUNDARY OF MAP AREA WITHIN GAME MAP, AND COMPUTER-READABLE STORAGE MEDIUM

(71) Applicant: Shanghai Lilith Network Technology Company Limited, Shanghai (CN)

(72) Inventor: Zhicheng Zhu, Shanghai (CN)

(73) Assignee: Shanghai Lilith Network Technology Company Limited, Shanghai (CN)

( * ) Notice: Subject to any disclaimer, the term of this patent is extended or adjusted under 35 U.S.C. 154(b) by 0 days.

(21) Appl. No.: 18/011,821

(22) PCT Filed: Nov. 16, 2021

(86) PCT No.: PCT/CN2021/130866
§ 371 (c)(1),
(2) Date: Dec. 20, 2022

(87) PCT Pub. No.: WO2022/105737
PCT Pub. Date: May 27, 2022

(65) Prior Publication Data
US 2023/0196671 A1  Jun. 22, 2023

(30) Foreign Application Priority Data

Nov. 20, 2020 (CN) .................. 202011308339.X

(51) Int. Cl.
*G06T 17/05* (2011.01)
*G06T 15/04* (2011.01)
(Continued)

(52) U.S. Cl.
CPC .......... *G06T 17/05* (2013.01); *A63F 13/5378* (2014.09); *A63F 13/60* (2014.09); *G06T 15/04* (2013.01)

(58) Field of Classification Search
None
See application file for complete search history.

(56) References Cited

U.S. PATENT DOCUMENTS 8,730,258 B1   5/2014   Cornell
9,251,607 B1   2/2016   Milne
(Continued)

FOREIGN PATENT DOCUMENTS

CN   101894363   11/2010
CN   106055331   10/2016
(Continued)

*Primary Examiner* — Tize Ma
(74) *Attorney, Agent, or Firm* — David R. Stevens; Stevens Law Group

(57) ABSTRACT

A method and a system for rendering a boundary of a map area within a game map, a computer readable storage medium, and a method for rendering includes: obtaining a boundary of a map area within a game map, and expanding the boundary toward the inside of the boundary along a normal direction of the boundary to form a fuzzy boundary; obtaining each boundary vertex of the fuzzy boundary, and linearly extending a preset distance from the boundary vertex along the normal direction of the fuzzy boundary to form a boundary grid; rendering a boundary color within a first range between the fuzzy boundary and the boundary grid, and rendering a boundary transparency within a second range that expands a preset distance from the fuzzy boundary to the inside of the boundary; rendering the boundary color from the first range with convolutional incremental expansion until the second range is covered.

7 Claims, 2 Drawing Sheets

(51) Int. Cl.
*A63F 13/5378* (2014.01)
*A63F 13/60* (2014.01)

(56) References Cited

U.S. PATENT DOCUMENTS

| | | | | |
|---|---|---|---|---|
| 2004/0189655 A1* | 9/2004 | Perry | ............. | G09G 5/28 |
| | | | | 345/582 |
| 2013/0002677 A1* | 1/2013 | Hatanaka | ............. | G06T 19/20 |
| | | | | 345/441 |
| 2018/0345146 A1* | 12/2018 | Okajima | ............. | G06F 3/011 |
| 2018/0345147 A1* | 12/2018 | Okajima | ............. | A63F 13/332 |
| 2020/0357117 A1* | 11/2020 | Lyman | ............. | G06T 7/0012 |

FOREIGN PATENT DOCUMENTS

| | | |
|---|---|---|
| CN | 108090945 | 5/2018 |
| CN | 108898679 A | 11/2018 |
| CN | 110288670 A | 9/2019 |
| CN | 111598986 A | 8/2020 |
| CN | 112509131 | 3/2021 |

\* cited by examiner

METHOD AND SYSTEM FOR RENDERING BOUNDARY OF MAP AREA WITHIN GAME MAP, AND COMPUTER-READABLE STORAGE MEDIUM

CROSS-REFERENCE TO RELATED APPLICATION

This application claims the benefit of Chinese Application Serial No. 202011308339.X, filed Nov. 20, 2020, which is hereby incorporated herein by reference in its entirety.

TECHNICAL FIELD

The present disclosure relates to the field of game control, and in particular, to a method and a system for rendering a boundary of a map area within a game map, and a computer-readable storage medium.

BACKGROUND

With rapid development of intelligent terminals, it is becoming more common for users to use the intelligent terminals to perform various operations, and it is especially common to use the intelligent terminals to play games. An SLG game (simulation game) is used as an example, a large number of game maps need to exist in the game for users to operate game objects to move within the game maps.

In the prior art, an area coloring method is adopted to distinguish between the game maps in the game, and the game maps that do not belong to the same faction or player are marked as different map areas. A map area usually includes a number of quadrilateral map pixels, and hexagonal map pixels are rarely used. The main reason is that area coloring of the hexagonal map pixels has many challenges compared with the quadrilateral map pixels. For example, more loads are required at runtime for fast calculation of area boundaries; rapid updates are required when map areas expand and contract; boundary lines of the map need to be rendered smoothly when map zooming is performed; the rendered boundary lines are jagged, or under different focal lengths, the rendered boundary lines may not be clearly seen.

Therefore, there is a need for a new method and system for rendering a dynamic area boundary in a game map, and a computer-readable storage medium, so that the boundary of the map area can be effectively rendered, and boundary interaction conforming to the user experience can be displayed at different heights.

SUMMARY

In order to overcome the technical defects, an objective of the present disclosure is to provide a method and a system for rendering a boundary of a map area within a game map, and a computer-readable storage medium, the boundary of the map area is rendered by using a smaller load, and the user may be presented with an interactive interface for distinguishing map areas of different ownership under various focal lengths.

The present disclosure discloses a method for rendering a boundary of a map area within a game map, comprising:

obtaining the boundary of the map area within the game map, and expanding the boundary toward the inside of the boundary along a normal direction of the boundary to form a fuzzy boundary;

obtaining each boundary vertex of the fuzzy boundary, and linearly extending a preset distance from the boundary vertex along the normal direction of the fuzzy boundary to form a boundary grid;

rendering a boundary color within a first range between the fuzzy boundary and the boundary grid, and rendering a boundary transparency within a second range that expands a preset distance from the fuzzy boundary to the inside of the boundary; and rendering the boundary color from the first range with convolutional incremental expansion until the second range is covered.

Preferably, obtaining each boundary vertex of the fuzzy boundary, and linearly extending a preset distance from the boundary vertex along the normal direction of the fuzzy boundary to form a boundary grid comprises:

obtaining a vertex of each map pixel that forms the fuzzy boundary as the boundary vertex;

forming an expansion line segment by taking each boundary vertex as a starting point and extending in the normal direction of the fuzzy boundary, wherein a length of the expansion line segment is the preset distance; and marking an intersection point of at least two expansion line segments as the boundary grid.

Preferably, obtaining each boundary vertex of the fuzzy boundary, and linearly extending a preset distance from the boundary vertex along the normal direction of the fuzzy boundary to form a boundary grid comprises:

when a part of the boundary grid formed based on the preset distance overflows the boundary, reducing an extension distance of the expansion line segment at the overflow part until the expansion line segment intersects with an opposite fuzzy boundary.

Preferably, the method further comprises:

when the boundary of the map area dynamically changes, obtaining an intersection boundary between the changed boundary and the original boundary, and a center position of the changed map area; and calculating a gradient from the intersection boundary to the center position and performing a gradient rendering.

The present disclosure further discloses a system for rendering a boundary of a map area within a game map, comprising:

an expansion module configured to obtain the boundary of the map area within the game map, and expand the boundary toward the inside of the boundary along a normal direction of the boundary, to form a fuzzy boundary;

a generating module configured to obtain each boundary vertex of the fuzzy boundary, and linearly extend a preset distance from the boundary vertex along the normal direction of the fuzzy boundary, to form a boundary grid; and a rendering module configured to render a boundary color within a first range between the fuzzy boundary and the boundary grid, render a boundary transparency within a second range that expands a preset distance from the fuzzy boundary to the inside of the boundary, and render the boundary color from the first range with convolutional incremental expansion until the second range is covered.

Preferably, the generating module includes:

an obtaining unit configured to obtain a vertex of each map pixel that forms the fuzzy boundary as a boundary vertex;

an expansion unit configured to form an expansion line segment by taking each boundary vertex as a starting point and extending in the normal direction of the fuzzy boundary, wherein a length of the expansion line segment is the preset distance; and a marking unit configured to mark an intersection point of at least two expansion line segments as the boundary grid.

Preferably, the generating module further comprises:

an erasing unit configured to: when a part of the boundary grid formed based on the preset distance overflows the boundary, reduce an extension distance of the expansion line segment at the overflow part until the expansion line segment intersects with an opposite fuzzy boundary.

Preferably, the rendering system further comprises:

an advancing module configured to: when the boundary of the map area dynamically changes, obtain an intersection boundary between the changed boundary and the original boundary, and a center position of the changed map area; and calculate a gradient from the intersection boundary to the center position and perform gradient rendering.

The present disclosure further discloses a computer readable storage medium on which a computer program is stored, and when the computer program is executed by a processor, the computer program implements the method.

With the technical solution, compared with the prior art, the technical solution has the following beneficial effects:
1. Calculation consumption is small, and the boundary of the map area within the game map can be quickly rendered.
2. When the height focal length is within the size range of 30 meters to 3000 meters, the user can clearly observe the boundary of the map area, consistent with the use experience of the game application.
3. There is no boundary penetration, and scenes with holes in the map area can be used.

DETAILED DESCRIPTION OF EMBODIMENTS

Figure 1:
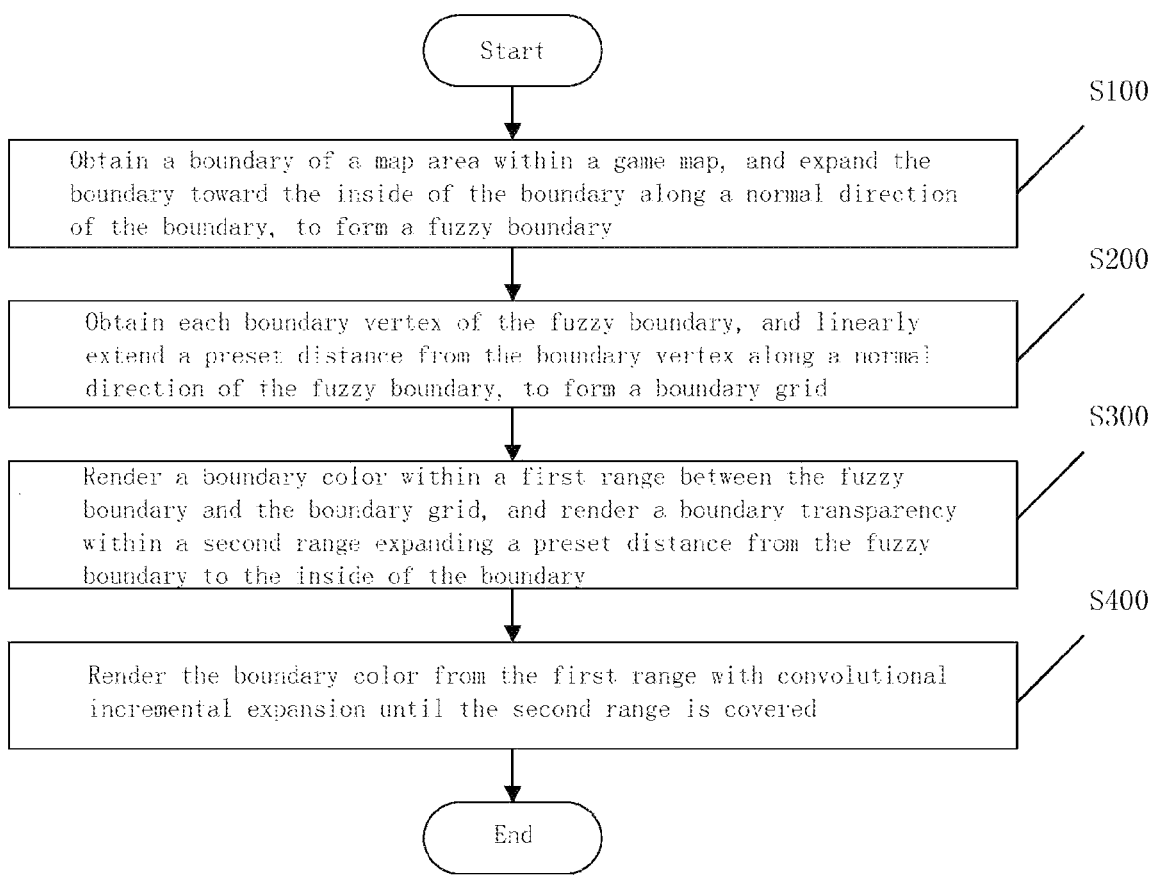
FIG. 1 is a schematic flowchart of a method for rendering a boundary of a map area within a game map in accordance with a preferred embodiment of the present disclosure.

Advantages of the present disclosure are described below in detail with reference to accompanying drawings and specific embodiments.

Exemplary embodiments are described in detail herein, and examples of the exemplary embodiments are illustrated in the accompanying drawings. Where the following description refers to the drawings, the same numerals in different drawings refer to the same or similar elements unless otherwise indicated. The implementations described in the exemplary embodiments below are not intended to represent all implementations consistent with the present disclosure. On the contrary, they are only examples of apparatuses and methods that are described in the appended claims in detail and that are consistent with some aspects of the present disclosure.

The terminology used in the present disclosure is for the purpose of describing particular embodiments only and is not intended to limit the present disclosure. The terms "a", "said", and "the" of singular forms used in the present disclosure and the appended claims are also intended to include plural forms, unless otherwise specified in the context clearly. It should further be understood that, the term "and/or" used herein indicates and includes any one or all of possible combinations of one or more associated listed items.

It should be understood that although terms "first", "second", "third" and the like may be used in the present disclosure to describe various information, the information is not limited by the terms. These terms are only used to differentiate information of a same type. For example, without departing from the scope of the present disclosure, first information may also be referred to as second information, and similarly the second information may also be referred to as the first information. Depending on the context, for example, a word "if" used herein may be explained as "while" or "when" or "in response to determining."

In the descriptions of the present disclosure, it should be understood that, directions or positional relationships indicated by terms "longitudinal", "lateral" "up", "down", "front", "back", "left", "right", "vertical", "horizontal", "top", "bottom", "inside", "outside", and the like are based on directions or positional relationships shown by the accompanying drawings, which are used only for describing the present disclosure and for description simplicity, but do not indicate or imply that an indicated apparatus or element must have a specific orientation or must be constructed and operated in a specific orientation. Therefore, this cannot be understood as a limitation on the present disclosure.

In the descriptions of the present disclosure, it should be noted that terms "installation" "joint", and "connection" should be understood in a broad sense unless there is a specific stipulation and limitation. For example, "connection" may be a mechanical connection or an electrical connection; and may be a connection inside two components, a direct connection, or an indirect connection through an intermediate medium. For persons of ordinary skill in the art, a specific meaning of the foregoing terms in the present disclosure may be understood according to a specific situation.

In the subsequent descriptions, a suffix such as "module", "component", or "unit" used to represent an element is merely used to facilitate description of the present disclosure, and does not have specific meanings. Therefore, the "module" and "component" can be interchanged with each other.

In the embodiment of the present disclosure, basic elements of the game map are hexagonal map pixels. The pixel referred to in the present disclosure is the smallest unit that constitutes a game map or a map area, and a regular hexagonal map pixel or a regular quadrilateral map pixel is mainly used in the embodiment of the present disclosure. The regular hexagonal map pixel is used as an example, and each edge of the hexagonal map pixel is defined as follows: $E_i$ represents an orientation of an edge of the regular hexagonal map pixel; $P_i$ is orientation of its six fixed points; $OpE_i$ is an opposite side of $E_i$. Then, according to the characteristics of the hexagon, it defines: $E_i = P_{i+1}$, and $OpE_i = E_i \geq 3 ? E_i - 3 : E_i + 3$. Using axisymmetric properties of the regular hexagon, the edge $E_i$ of the hexagon is defined as a half edge. When an edge to be calibrated is Ei and another Ei belonging to the map pixel in the same map area, calibration is stopped. When an edge to be calibrated is Ei and Fi belonging to the map pixels in two different map areas, calibration is continued.

A plurality of map pixels form a map area, and each map area belongs to a certain player in the game map, or when a map area is in a neutral state, the map area does not belong to any player. To distinguish different ownerships in the game map, different colors will be used to render the boundary of the map area. Therefore, when the ownership of the map area changes, for example, when a certain map area is newly occupied by a player, the boundary of the rendered area also changes. When the player loses the ownership of a certain map area, the boundary of the rendered area also changes accordingly.

When a user experiences a game application, and the map area of the game map is occupied or abandoned in the game, a new boundary is dynamically generated according to the state of the area. Because the boundary is initially formed by hexagonal edges, if the boundary is not rendered, more jaggies appear in the interactive performance. Therefore, the rendering of boundaries requires attention to smoothness and stability. That is, the boundary lines in the game are not just viewed at the same height, but need to be viewed on a scale ranging from 30 meters to 3000 meters in camera height. Without special processing, the boundary lines rendered at the bottom layer will be hard to be seen at the top layer. Therefore, referring to FIG. 1, FIG. 1 is a method for rendering a boundary of a map area in a game map in accordance with a preferred embodiment of the present disclosure, and the method specifically includes the following steps:

S100: Obtain a boundary of a map area within a game map, and expand the boundary toward the inside of the boundary along a normal direction of the boundary, to form a fuzzy boundary.

After the map area in the game map is obtained, a boundary of each map area is obtained first, regardless of whether the map area is a merged or split map area. When the map area is stable, each boundary needs to be rendered inside. In order to see clearly under the higher height of the camera, the width of the boundary needs to be expanded. Therefore, it expands to the inside of the boundary along the normal direction of the boundary. At the same time, in order to form smooth rendering from the boundary to the inside on an interaction interface, the range formed by the expansion is a fuzzy boundary. For example, it is implemented by Gaussian smoothing and Hermite Spline interpolation.

S200: Obtain each boundary vertex of the fuzzy boundary, and linearly extend a preset distance from the boundary vertex along a normal direction of the fuzzy boundary, to form a boundary grid.

For the subsequent processing of the fuzzy boundary, it will be used to obtain each boundary vertex of the fuzzy boundary, i.e., the endpoints on the boundary line that forms the boundary. For the selection of the endpoints, the endpoints can be the endpoints on the boundary line separated by a certain distance, or can be the continuous endpoints forming the boundary line, and the selection is based on the upper limit of the number of endpoints that can be processed by the system load. After obtaining the boundary vertices, each boundary vertex is used as the starting point, and it extends along the normal direction of the fuzzy boundary (e.g., the vertical direction of the tangent line at the position of the curve where the boundary vertex is located), i.e., a ray is formed, and cut off after extending a preset distance. Thus, it forms a boundary grid inside the fuzzy boundary, which is used as a range for subsequent pre-rendering.

S300: Render a boundary color within a first range between the fuzzy boundary and the boundary grid, and render a boundary transparency within a second range expanding a preset distance from the fuzzy boundary to the inside of the boundary.

With the processing of steps S100 and S200, three parts are formed inside the boundary of the map area, a first part is the fuzzy boundary, a second part is an area from the fuzzy boundary to the boundary grid, and a third part is an area from the boundary grid to the cut-off preset distance. For the first part, different colors can be painted directly on different map areas to differentiate different and even adjacent map areas. For the second part, in the first range from the fuzzy boundary to the boundary grid, it pre-renders a certain width of boundary color to ColorRT. The certain width is an area of the first range between the fuzzy boundary and the boundary grid. At the same time, for the second part together with the third part, i.e. the second range (full width) that the fuzzy boundary expands a preset distance from the fuzzy boundary to the inside of the boundary, it pre-renders a boundary transparency to AlphaRT. That is, in step S300, a part of the range inside the boundary has been colored, while a larger part of the range has been given transparency to present a part of the range inside the boundary with the same color as the boundary, but a more transparent part, presenting a view extending from the boundary inward in the interactive display.

S400: Render the boundary color from the first range with convolutional incremental expansion until the second range is covered.

Figure 2:
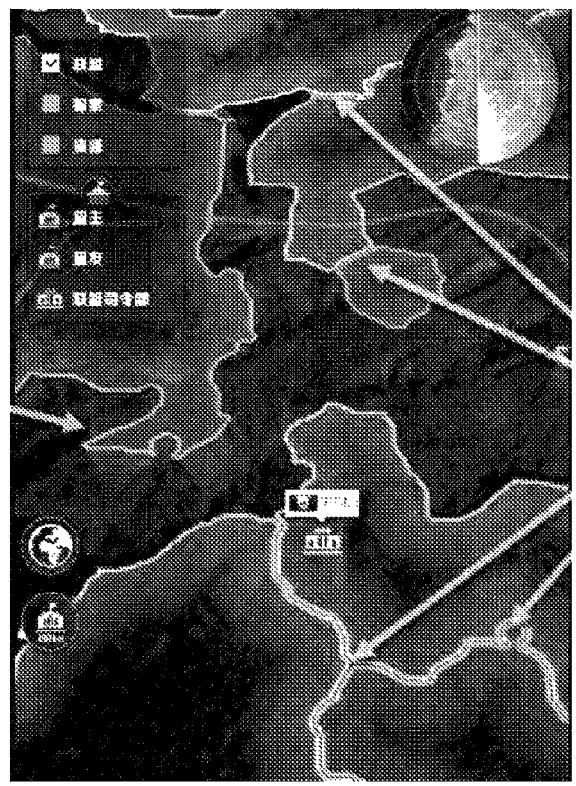
FIG. 2 is a schematic diagram of a boundary of a map area within a game map after rendering in accordance with a preferred embodiment of the present disclosure.

In step S400, because an area that has been rendered and colored is small, boundaries are not easily visible at very high heights of the camera. Therefore, it renders the boundary color from the first range with convolutional incremental expansion until the second range is covered. That is, by performing Kernel Size incremental expansion of ColorRT to make its boundary color reach the width of the preset distance, the effect shown in FIG. 2 is displayed. As can be seen, the different colors rendered represent the map areas under different affiliations or camps, while the extensions under different transparency extend outside the boundaries.

Further, the step S200 of obtaining each boundary vertex of the fuzzy boundary, and linearly extending by a preset distance from the boundary vertex along a normal direction of the fuzzy boundary, to form a boundary grid includes:

S210: Obtain a vertex of each map pixel forming the fuzzy boundary as the boundary vertex.

In this embodiment, the boundary vertex is a vertex of each map pixel that forms the fuzzy boundary. More preferably, the concept of the vertex can be blurred, that is, the boundary of the map area is regarded as a closed line segment, and the whole of the closed line segment is regarded as the vertex to be extended. That is, the concept of a point is extended to the concept of a line.

S220: Form an expansion line segment by taking each boundary vertex as a starting point, and extending in the normal direction of the fuzzy boundary, where a length of the expansion line segment is a preset distance.

S230: Mark an intersection point of at least two expansion line segments as a boundary grid.

Since the boundary itself is curved, the intersection point of the expansion line segments must appear after the formation, then the formation of the boundary grid is defined by the intersection point. That is, the area from the fuzzy boundary to the intersection point is the overall area of the boundary grid. The natural formation of the intersection point is used to determine the width of the boundary grid, which can basically meet the visual requirements under different focal lengths.

Further, step S200 also includes:

S240: When a part of the boundary grid formed based on the preset distance overflows the boundary, it reduces an extension distance of the expansion line segment at the overflow part until the expansion line segment intersects with an opposite fuzzy boundary.

It can be understood that, in some cases, the width of the map area is relatively narrow, so that the opposite expansion line segment extends to the outside of the boundary, that is, overflows the boundary. Even the boundary grid formed by the intersection point of the expansion line segments also overflows the boundary. In this regard, when the map area next to a map area is neutral, the color of the rendered map area tends to overflow to other map areas, which obviously does not meet the attribution requirements and interaction requirements of the map area. Therefore, in this step S240, when the part of the boundary grid formed based on the preset distance overflows the boundary, the extension distance of the expansion line segment at the overflow part is reduced until the expansion line segment intersects with the opposite fuzzy boundary, that is, the expansion line segment continues to extend, and when the expansion line segment intersects with the opposite fuzzy boundary, the extension is stopped. Thus, the first range pre-rendered in step S300 is maintained inside the boundary, and the overflow of the rendering range does not occur.

Preferably or optionally, the method for rendering further includes:

S500: When the boundary of the map area dynamically changes, obtain an intersection boundary between the changed boundary and the original boundary, and a center position of the changed map area.

In an actual application of the game, when the area boundary expands or contracts, animation is required to represent the expansion/contraction process. Therefore, when the boundary of the map area dynamically changes, it obtains the intersection boundary between the changed boundary and the original boundary, and the center position of the changed map area. The boundary advancement process is simulated by calculating the gradient map from the intersection of the new area boundary with the original boundary to the center of the new area.

S600: Calculate a gradient from the intersection boundary to the center position and perform a gradient rendering.

In a specific simulation method, gradient rendering is performed on the gradient from the intersection boundary to the center position to show the change of the boundary.

With the above configuration, in the context of boundary generation and boundary geometric operations (union and difference operations), the embodiments of the present disclosure all have excellent performance. In the final rendering, degradation of rendering performance is avoided due to complexity of translucent object rendering itself and an actual situation of this example (effective under multi-level boundaries).

Figure 3:
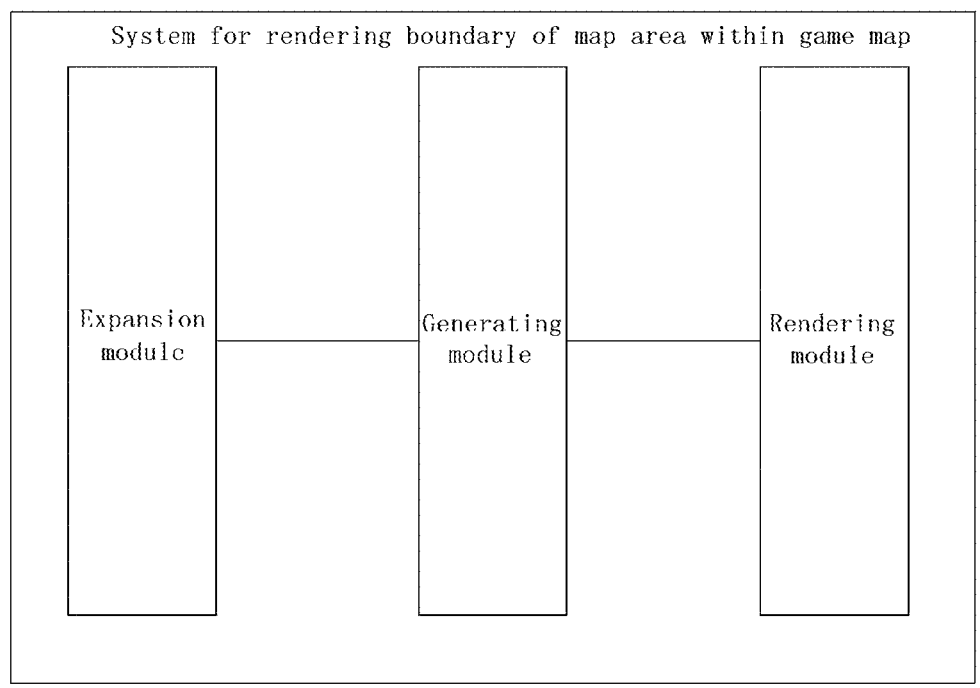
FIG. 3 is a schematic structural diagram of a system for rendering a boundary of a map area within a game map according to a preferred embodiment of the present disclosure.

Referring to FIG. 3, FIG. 3 is a rendering system for a boundary of a map area in a game map in accordance with a preferred embodiment of the present disclosure, and the system includes:

an expansion module configured to obtain a boundary of a map area within a game map, and expand the boundary toward the inside of the boundary along a normal direction of the boundary, to form a fuzzy boundary; a generating module configured to obtain each boundary vertex of the fuzzy boundary, and linearly extend a preset distance from the boundary vertex along a normal direction of the fuzzy boundary, to form a boundary grid; and a rendering module configured to render a boundary color in a first range between the fuzzy boundary and the boundary grid, render a boundary transparency in a second range expanding a preset distance from the fuzzy boundary to the inside of the boundary, and render the boundary color from the first range with convolutional incremental expansion until the second range is covered.

Preferably or optionally, the generating module includes an obtaining unit configured to obtain a vertex of each map pixel that forms the fuzzy boundary as a boundary vertex; an expansion unit configured to form an expansion line segment by taking each boundary vertex as a starting point and extending in the normal direction of the fuzzy boundary, where a length of the expansion line segment is the preset distance; and a marking unit configured to mark an intersection point of at least two expansion line segments as the boundary grid.

Preferably or optionally, the generating module further includes an erasing unit configured to: when a part of the boundary grid formed based on the preset distance overflows the boundary, reduce an extension distance of the expansion line segment at the overflow part until the expansion line segment intersects with an opposite fuzzy boundary.

Preferably or optionally, the rendering system further includes a advancing module configured to: when the boundary of the map area dynamically changes, obtain an intersection boundary between the changed boundary and the original boundary, and a center position of the changed map area; and calculate a gradient of the intersection boundary to the center position and perform a gradient rendering.

The present disclosure further discloses a computer-readable storage medium on which a computer program is stored, and when the computer program is executed by a processor, the above steps are implemented.

It should be noted that the embodiments of the present disclosure have better practicability, and do not limit the present disclosure in any form, and any person skilled in the art may use the technical contents disclosed above to change or modify into equivalent effective embodiments. However, any amendments or equivalent changes and modifications made to the above embodiments according to the technical essence of the present disclosure without departing from the content of the technical solution of the present disclosure still shall fall within the scope of the technical solution of the present disclosure.

I claim:

1. A method for rendering a boundary of a map area within a game map, comprising:
   obtaining the boundary of the map area within the game map, and expanding the boundary toward the inside of the boundary along a normal direction of the boundary to form a fuzzy boundary;
   obtaining each boundary vertex of the fuzzy boundary, and linearly extending a preset distance from the boundary vertex along the normal direction of the fuzzy boundary to form a boundary grid, wherein the obtaining comprises:
      obtaining a vertex of each map pixel that forms the fuzzy boundary as the boundary vertex;
      forming an expansion line segment by taking each boundary vertex as a starting point and extending in the normal direction of the fuzzy boundary, wherein a length of the expansion line segment is the preset distance; and marking an intersection point of at least two expansion line segments as the boundary grid;

rendering a boundary color within a first range between the fuzzy boundary and the boundary grid, and rendering a boundary transparency within a second range that expands a preset distance from the fuzzy boundary to the inside of the boundary; and rendering the boundary color from the first range with convolutional incremental expansion until the second range is covered.

2. The method for rendering according to claim 1, wherein, obtaining each boundary vertex of the fuzzy boundary, and linearly extending a preset distance from the boundary vertex along the normal direction of the fuzzy boundary to form a boundary grid comprises:

when a part of the boundary grid formed based on the preset distance overflows the boundary, reducing an extension distance of the expansion line segment at the overflow part until the expansion line segment intersects with an opposite fuzzy boundary.

3. The method for rendering according to claim 1, further comprising:

when the boundary of the map area dynamically changes, obtaining an intersection boundary between the changed boundary and the original boundary, and a center position of the changed map area; and calculating a gradient from the intersection boundary to the center position and performing a gradient rendering.

4. A system for rendering a boundary of a map area within a game map, comprising:

an expansion module configured to obtain the boundary of the map area within the game map, and expand the boundary toward the inside of the boundary along a normal direction of the boundary, to form a fuzzy boundary;

a generating module configured to obtain each boundary vertex of the fuzzy boundary, and linearly extend a preset distance from the boundary vertex along the normal direction of the fuzzy boundary, to form a boundary grid, wherein the generating module comprises:

an obtaining unit configured to obtain a vertex of each map pixel that forms the fuzzy boundary as a boundary vertex;

an expansion unit configured to form an expansion line segment by taking each boundary vertex as a starting point and extending in the normal direction of the fuzzy boundary, wherein a length of the expansion line segment is the preset distance; and a marking unit configured to mark an intersection point of at least two expansion line segments as the boundary grid; and a rendering module configured to render a boundary color within a first range between the fuzzy boundary and the boundary grid, render a boundary transparency within a second range that expands a preset distance from the fuzzy boundary to the inside of the boundary, and render the boundary color from the first range with convolutional incremental expansion until the second range is covered.

5. The system for rendering according to claim 4, wherein, the generating module further comprises:

an erasing unit configured to: when a part of the boundary grid formed based on the preset distance overflows the boundary, reduce an extension distance of the expansion line segment at the overflow part until the expansion line segment intersects with an opposite fuzzy boundary.

6. The system for rendering according to claim 4, wherein the rendering system further comprises:

an advancing module configured to: when the boundary of the map area dynamically changes, obtain an intersection boundary between the changed boundary and the original boundary, and a center position of the changed map area; and calculate a gradient from the intersection boundary to the center position and perform gradient rendering.

7. A computer readable storage medium on which a computer program is stored, wherein the computer program implements a method for rendering a boundary of a map area within a game map-when the computer program is executed by a processor, the method comprising:

obtaining the boundary of the map area within the game map, and expanding the boundary toward the inside of the boundary along a normal direction of the boundary to form a fuzzy boundary;

obtaining each boundary vertex of the fuzzy boundary, and linearly extending a preset distance from the boundary vertex along the normal direction of the fuzzy boundary to form a boundary grid, wherein the obtaining comprises:

obtaining a vertex of each map pixel that forms the fuzzy boundary as the boundary vertex;

forming an expansion line segment by taking each boundary vertex as a starting point and extending in the normal direction of the fuzzy boundary, wherein a length of the expansion line segment is the preset distance; and marking an intersection point of at least two expansion line segments as the boundary grid;

rendering a boundary color within a first range between the fuzzy boundary and the boundary grid, and rendering a boundary transparency within a second range that expands a preset distance from the fuzzy boundary to the inside of the boundary; and rendering the boundary color from the first range with convolutional incremental expansion until the second range is covered.

* * * * *